(12) United States Patent
Fujii et al.

(10) Patent No.: US 9,617,613 B2
(45) Date of Patent: Apr. 11, 2017

(54) METHOD FOR MANUFACTURING FERROUS MATERIAL

(71) Applicant: OSAKA UNIVERSITY, Suita-shi, Osaka (JP)

(72) Inventors: Hidetoshi Fujii, Suita (JP); Yoshiaki Morisada, Suita (JP)

(73) Assignee: OSAKA UNIVERSITY, Suita-shi (JP)

( * ) Notice: Subject to any disclaimer, the term of this patent is extended or adjusted under 35 U.S.C. 154(b) by 289 days.

(21) Appl. No.: 14/384,876

(22) PCT Filed: Mar. 12, 2013

(86) PCT No.: PCT/JP2013/056800
§ 371 (c)(1),
(2) Date: Sep. 12, 2014

(87) PCT Pub. No.: WO2013/137249
PCT Pub. Date: Sep. 19, 2013

(65) Prior Publication Data
US 2015/0007912 A1 Jan. 8, 2015

(30) Foreign Application Priority Data
Mar. 14, 2012 (JP) .................................. 2012-057986

(51) Int. Cl.
*B23K 20/12* (2006.01)
*C21D 8/00* (2006.01)
(Continued)

(52) U.S. Cl.
CPC ............ *C21D 8/005* (2013.01); *B23K 20/122* (2013.01); *C21D 9/50* (2013.01); *C21D 7/04* (2013.01);
(Continued)

(58) Field of Classification Search
CPC ..... B23K 20/122–20/128; C21D 8/005; C21D 2211/008; C21D 7/04; C21D 9/50; C21D 9/46; C21D 2211/001
(Continued)

(56) References Cited

U.S. PATENT DOCUMENTS

| 4,609,410 A * | 9/1986 | Hu | C21D 8/0473 |
|---|---|---|---|
| | | | 148/631 |
| 5,080,727 A * | 1/1992 | Aihara | C22F 1/10 |
| | | | 148/320 |

(Continued)

FOREIGN PATENT DOCUMENTS

| CN | 101323054 B | * | 9/2010 | |
|---|---|---|---|---|
| GB | 1046491 A | * | 10/1966 | ............... C21D 1/22 |

(Continued)

OTHER PUBLICATIONS

Machine translation of JP 2012040584 A.*
International Search Report dated Jun. 4, 2013 issued in corresponding application No. PCT/JP2013/056800.

*Primary Examiner* — Kiley Stoner
(74) *Attorney, Agent, or Firm* — Westerman, Hattori, Daniels & Adrian, LLP

(57) ABSTRACT

A base material of a ferrous material is heated to an $A_{C1}$ point, which is a temperature to cause austenite appearance, or higher, and austenite appears in the base material 1a and 1b (S101). An amount of a strain assuming that an $M_f$ point, which is a temperature where the base material becomes martensite completely, is decreased to be less than room temperature is introduced into the base material (S102). The all ferrous material becoming martensite on the occasion of cooling the ferrous material to room temperature is prevented. The base material is cooled to room temperature at a cooling rate where a line extrapolated a cooling curve of the base material intersects with a region where martensite
(Continued)

is produced on the CCT diagram (S103). Austenite remains in the manufactured ferrous material at room temperature.

3 Claims, 25 Drawing Sheets

(51) Int. Cl.
*C21D 9/50* (2006.01)
*C21D 7/04* (2006.01)
*C21D 9/46* (2006.01)

(52) U.S. Cl.
CPC .......... *C21D 9/46* (2013.01); *C21D 2211/001* (2013.01); *C21D 2211/008* (2013.01)

(58) Field of Classification Search
USPC ................. 228/112.1, 2.1; 148/508, 653
See application file for complete search history.

(56) References Cited

U.S. PATENT DOCUMENTS

| | | | | |
|---|---|---|---|---|
| 5,746,845 A * | 5/1998 | Yoshida | ................... | C21D 6/02 148/587 |
| 6,319,338 B1 * | 11/2001 | Kawano | ................... | C21D 8/02 148/320 |
| 2003/0138342 A1 * | 7/2003 | Hirasawa | ............ | C21D 8/0205 420/38 |
| 2008/0078478 A1 * | 4/2008 | Mori | ................ | C21D 1/32 148/504 |
| 2008/0118390 A1 * | 5/2008 | Kizu | ................... | C21D 8/0205 420/85 |
| 2009/0229417 A1 * | 9/2009 | Shepard | ................. | B21D 37/01 76/101.1 |
| 2010/0038408 A1 * | 2/2010 | Keshavan | ........... | B23K 20/1275 228/112.1 |
| 2010/0119860 A1 * | 5/2010 | Hitoshi | ................... | C21D 8/105 428/586 |
| 2010/0159265 A1 * | 6/2010 | Fairchild | .............. | B23K 9/0282 428/586 |
| 2011/0073222 A1 * | 3/2011 | Strandell | ................. | C21D 1/10 148/575 |
| 2012/0118438 A1 * | 5/2012 | Nakagaito | ............ | C21D 8/0226 148/533 |
| 2012/0312433 A1 * | 12/2012 | Mizuta | ..................... | C21D 9/46 148/645 |
| 2013/0087253 A1 * | 4/2013 | Matsuda | ................. | C21D 9/46 148/533 |
| 2013/0133786 A1 * | 5/2013 | Matsuda | ................. | C21D 1/22 148/533 |
| 2013/0240096 A1 * | 9/2013 | Browne | ................... | C21D 8/00 148/563 |
| 2015/0027593 A1 * | 1/2015 | Hata | ..................... | C22C 38/00 148/504 |

FOREIGN PATENT DOCUMENTS

| | | | | |
|---|---|---|---|---|
| JP | EP 1240969 A2 * | 9/2002 | ......... | B23K 20/1265 |
| JP | 2008-73694 A | 4/2008 | | |
| JP | 2012-40584 A | 3/2012 | | |
| JP | 2012040584 A * | 3/2012 | | |
| WO | 2010/059201 A2 | 5/2010 | | |

* cited by examiner

FIG. 10

| Type | Chemical composition (mass %) | | | | | |
|---|---|---|---|---|---|---|
| | C | Cr | W | V | Ta |
| Ferrous material 1 | 0.1 | 8 | 2 | 0.2 | 0.04 |

FIG. 15

| | Fe | C | Si | Mn | P | S | Cu | Cr | Mo |
|---|---|---|---|---|---|---|---|---|---|
| Ferrous material 2 | Balance | 0.202 | 0.237 | 0.608 | 0.008 | 0.000 | 0.103 | 1.07 | 0.16 |
| Ferrous material 3 | Balance | 0.397 | 0.165 | 0.674 | 0.015 | 0.005 | 0.151 | 1.11 | 0.15 | mass%

FIG. 24

| Element | Chemical composition (mass %) | | | | | | | |
|---|---|---|---|---|---|---|---|---|
| | C | Si | Mn | P | S | Cr | Ni | Cu | Fe |
| Ferrous material 4 | 0.95 | 0.19 | 0.42 | 0.017 | 0.003 | 0.147 | 0.01 | 0.01 | Balance |

METHOD FOR MANUFACTURING FERROUS MATERIAL

TECHNICAL FIELD

One embodiment of the present invention relates to a method for manufacturing a ferrous material, and it relates to a method for manufacturing a ferrous material to manufacture a ferrous material where its strength and ductility have been enhanced by providing processing to a base material of the ferrous material.

BACKGROUND TECHNOLOGY

Friction stir welding (FSW) has various superior characteristics including a joining characteristic, and is applied to an aluminum alloy in various industrial fields soon after development. In the meantime, even regarding the friction stir welding of ferrous materials occupying many of structural materials, the study has been actively conducted recently. In the study stage, it is reported in Non-patent Literatures 1 to 3 that carbon steel is welded by friction stir welding.

PRIOR ART LITERATURE

Non-Patent Literature

Non-patent Literature 1: W. M. Thomas and two others, "Sci. Technol. Weld. Join. 4", 1999, p. 365 & #8211; 372
Non-patent Literature 2: T. J. Lienert and three others, "Weld. J. 82", 2003, 1s-9s
Non-patent Literature 3: A. P. Reynolds and three others, "Sci. Technol. Weld. Join. 8", 2003, p. 455 & #8211; 460

SUMMARY OF THE INVENTION

Problem to be Solved by the Invention

Herein, although improvement of mechanical characteristics of the ferrous materials is attempted according to composition and structure, it is extremely difficult to satisfy both of high strength and high ductility. Even in a friction stir welded joint of the ferrous material, the improvement of the strength and ductility is an extremely important factor for practical purposes, and it is in demand from various industries including cars. In addition, even in processing, such as rolling or forging, other than the friction stir welding, it is an extremely important agenda to satisfy both of improvement of strength and improvement of ductility of ferrous materials.

One embodiment of the present invention has been accomplished in light of the problem above, and the objective is to provide a method for manufacturing a ferrous material enabling manufacturing of a ferrous material having high ductility while having high strength.

Means for Solving the Problem

One embodiment of the present invention is a method for manufacturing a ferrous material including:
a heating step to heat a base material of a ferrous material to an $A_{c1}$ point, which is a temperature where austenite appears, or higher;
a strain introduction step to introduce an amount of strain that is assumed that an $M_f$ point, which is a temperature where the base material becomes martensite completely, is decreased to be less than a temperature for using the ferrous material, into the base material; and
a cooling step to cool the base material where the heating step and the strain introduction step have been carried out to temperature, which is higher than the $M_f$ point, at a cooling rate assuming that a line extrapolated with a cooling curve intersects with a region where martensite is produced in the base material on a continuous cooling transformation diagram (CCT line diagram).

According to this configuration, in the heating step, the base material of a ferrous material is heated to the $A_{c1}$ point, which is a temperature where austenite appears, or higher. This enables appearance of austenite in the base material. In the strain introduction step, an amount of a strain, which is assumed that the $M_f$ point where the base material becomes martensite completely is decreased to be less than a temperature for using the ferrous material, into the base material. Consequently, on the occasion of cooling the ferrous material to temperature for using the ferrous material, such as room temperature, it can prevent the all ferrous material from becoming martensite. When a strain is introduced into the base material, a region to produce ferrite or pearlite is also expanded. However, in the cooling step, the base material where the heating step and the strain introduction step have been carried out is cooled to temperature, which is higher than the $M_f$ point, at a cooling rate assuming that a line extrapolated with a cooling curve, which is a line to indicate a function of temperature to a time of the base material, intersects with a region where martensite is produced in a continuous cooling transformation diagram (CCT line diagram) indicating a phase transformation on the occasion when the base material of a ferrous material is continuously cooled on a plane of coordinates of time and temperature. Consequently, austenite remains in the structure of the manufactured ferrous material at temperature to use. When external stress is applied to the ferrous material where austenite remains, the austenite that has received a strain transforms into hard martensite, and strength of the portion that has received a strain is improved. As a result, the deformation of this portion is suppressed, and a TRIP effect to propagate metamorphosis to the portion of un-transformed austenite, which has relatively low strength, occurs. Consequently, a ferrous material having high ductility while having high strength can be manufactured.

In this case, an inspection step to inspect the microstructure of the base material where the cooling step has been carried out is further included, and when it is determined in the inspection step that no austenite remains in the formulation of the base material but martensite has been produced, on the occasion of manufacturing a ferrous material next, at least either an amount of a strain to be introduced into the base material in the strain introduction step or an additive amount of an austenite stabilization element to the base material is increased, and if it is determined in the inspection step that no austenite remains in the formulation of the base material but either ferrite or pearlite has been produced, on the occasion of manufacturing a ferrous material next, at least either a cooling rate in the cooling step or an additive amount of an element to suppress diffusion transformation to the base material can be increased.

According to this configuration, the inspection step to inspect the microstructure of the base material where the cooling step has been carried out is further included. When it is determined in the inspection step that no austenite remains in the base material but martensite has been produced, it is assumed that the $M_f$ point is not sufficiently decreased relative to temperature for using the ferrous material. Then, on the occasion of manufacturing the ferrous material next, at least either an amount of a strain to be introduced into the base material in the strain introduction step or an additive amount of austenite stabilization element, such as C, Mn, Ni, Cr or Mo, to the base material is increased. This enables to cause austenite to remain by sufficiently decreasing the $M_f$ point relative to the temperature to use the ferrous material. Further, in the inspection step, if it is determined that no austenite remains in the formation of the base material and either ferrite or pearlite has been produced, in order to avoid the region where ferrite or pearlite is produced in the CTT line diagram, it is assumed that the cooling rate is too low or the region where the ferrite or pearlite is produced has been excessively expanded. Then, on the occasion of manufacturing a ferrous material next, at least either a cooling rate in the cooling step or an additive amount of an element to inhibit diffusion transformation of an element with a greater atomic radius than Fe, such as Mo, W, V or Ta, is increased. This enables to avoid the region where ferrite or pearlite is produced on the CCT line diagram and to remain austenite.

In the heating step and the strain introduction step, the base material is heated and a strain is introduced into the base material by rotating a rotating tool while a tip part of the stick-shaped rotating tool comes into contact with the base material, and in the cooling step, the base material can be cooled down at least either by moving the tip part of the rotating tool in the situation where the rotating tool is rotated while the tip part of the rotating tool comes into contact with the base material or by separating the tip part of the rotating tool from the base material.

According to this construction, in the heating step and the strain introduction step, the base material is heated and a strain is introduced to the base material by rotating the rotating tool while a tip part of the stick-shaped rotating tool comes into contact with the base material, and in the cooling step, the base material is cooled either by moving the tip part of the rotating tool in the situation where the rotating tool is rotated while the tip part of the rotating tool comes into contact with the base material or by separating the tip part of the rotating tool from the base material. Utilization of such friction stir welding technology enables the heating step, the strain introduction step and the cooling step in uniprocessing. Further, the utilization of the friction stir welding technology facilitates local heating of the base material and local introduction of a strain into the base material. Further, according to this construction, adjustment of a traveling speed of the tip part of the rotating tool or the rotation rate of the rotating tool facilitates control of the cooling rate.

Effect of the Invention

According to the method for manufacturing a ferrous material in one embodiment of the present invention, it becomes possible to manufacture a ferrous material having high ductility while having high strength.

BRIEF DESCRIPTION OF DRAWINGS

FIG. 10 is a table showing a chemical composition of the ferrous material 1 in Experimental example 1.

FIG. 15 is a table showing chemical compositions of the ferrous material 2 and the ferrous material 3 in Experimental example 2.

FIG. 24 is a table showing a chemical composition of a ferrous material 4 in Experimental example 3.

MODE FOR CARRYING OUT THE INVENTION

Hereafter, an embodiment of the method for manufacturing ferrous materials relating to the embodiments of the present invention is described in detail. In the present embodiment, a ferrous material with enhanced strength and ductility is manufactured by utilizing the friction stir welding technology. First, the friction stir welding is briefly explained.

Figure 1:
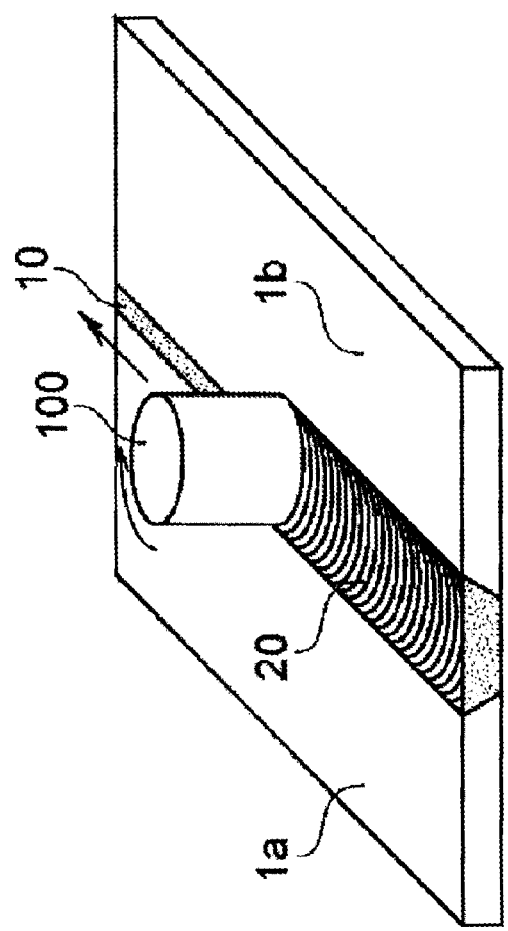
FIG. 1 is a perspective view showing a mode of friction stir welding in the method for manufacturing a ferrous material in an embodiment.

As shown in FIG. 1, in the friction stir welding, the base ferrous material 1a and 1b are joined by the formation of a stir zone 20 at the butting tip parts of base material plates 1a and 1b. A ferrous material with enhanced strength and ductility is manufactured in the stir zone 20 by rotating [the rotating tool 100] under predetermined conditions to be described later while a probe 102 at the tip of a rotating tool 100 comes into contact with on the stir zone 20 of the base material plates 1a and 1b, and by further traveling the rotating tool 100 under predetermined conditions to be described later along a longitudinal direction of the stir zone 20. In this case, the rotating tool 100 may pass through twice or more along the longitudinal direction of the stir zone 20.

For the base material plates 1a and 1b, for example, ferrite steel, Cr—Mo steel and high-carbon steel can be used. An additive 10 can be filled on the stir zone 20 of the base material plates 1a and 1b depending on the situation. As the additive 10, powdery or granular C, Mn, Ni, Cr, Mo, W, V and Ta can be used. Further, as the additive 10, a plate-state or a thin sheet-state C, Mn, Ni, Cr, Mo, W, V and Ta may be arranged on surfaces of the base material plates 1a and 1b on the stir zone 20 or other than on the stir zone 20. Alternatively, not limiting to the stir zone 20, the additive 10 may be added to the entire compositions of the base material plates 1a and 1b.

As described later, since the cooling rate of the stir zone 20 becomes important in the present embodiment, a cooling means to forcibly cool the stir zone 20 externally by circulating a cooled refrigerant on the upper surface or the lower surface of the stir zone 20 may be arranged. As the cooling means in this case, for example, a means to supply liquid $CO_2$, liquid nitrogen and water to the stir zone 20 can be adopted.

Figure 2:
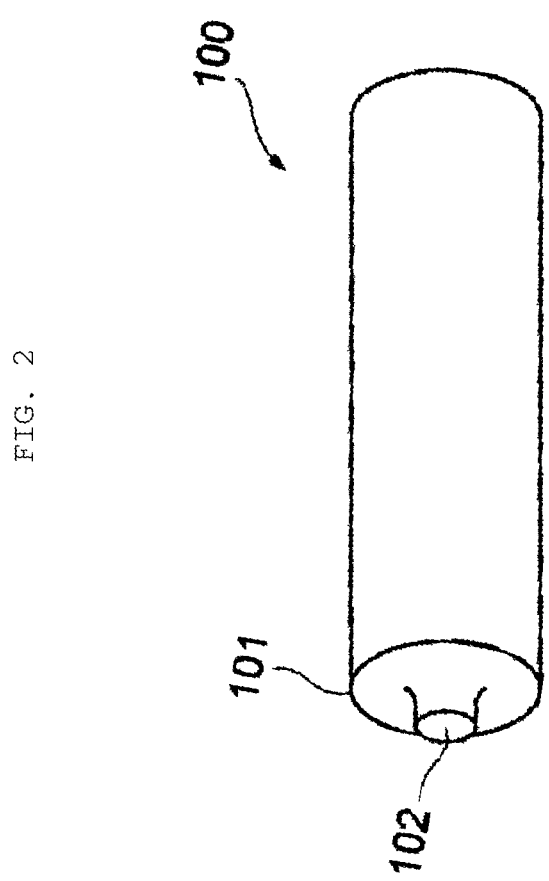
FIG. 2 is a perspective view of a rotating tool in FIG. 1.

In the present embodiment, the rotating tool 100 as shown in FIG. 2 is prepared. The rotating tool 100 forms to be roughly cylindrical, and it is provided with the roughly-columnar probe 102 with a smaller diameter than a shoulder 101 at the tip. A material of the rotating tool 100, for example, can be made from tool steel, such as SKD61 steel standardized in Japanese Industrial Standards, cemented carbide primarily constituting of tungsten carbide (WC) or ceramics, such as $Si_3N_4$.

Figure 3:
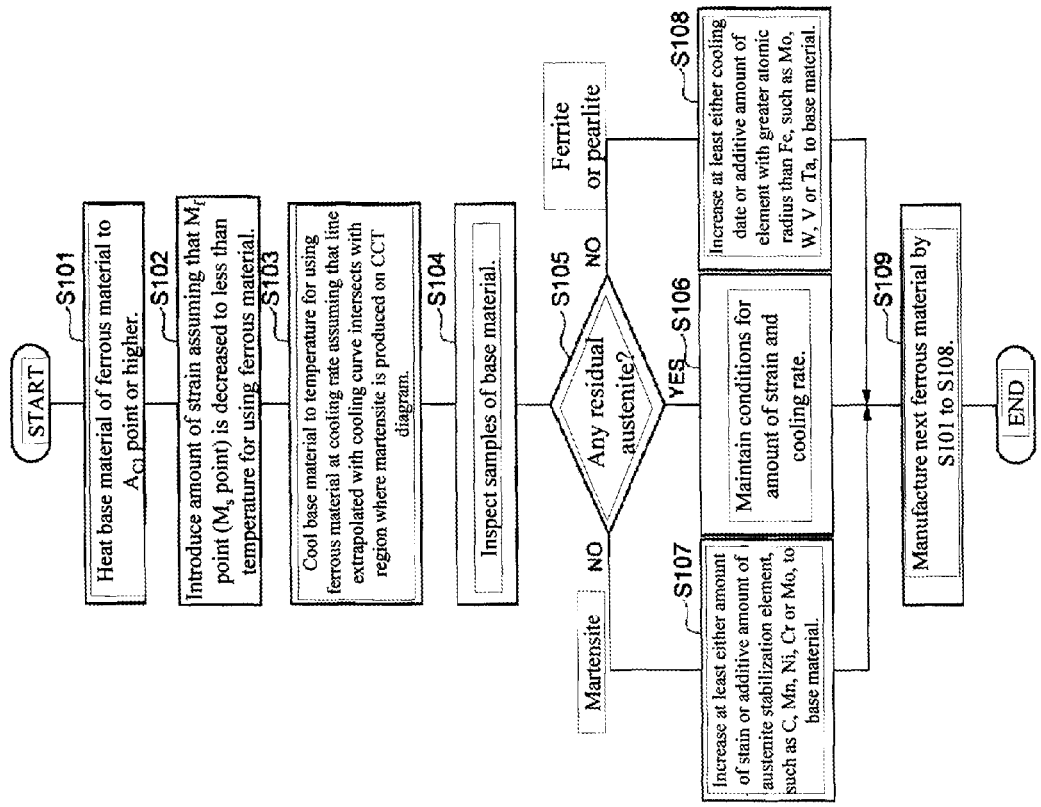
FIG. 3 is a flowchart showing steps of a ferromagnetic material in the embodiment.
Figure 4:
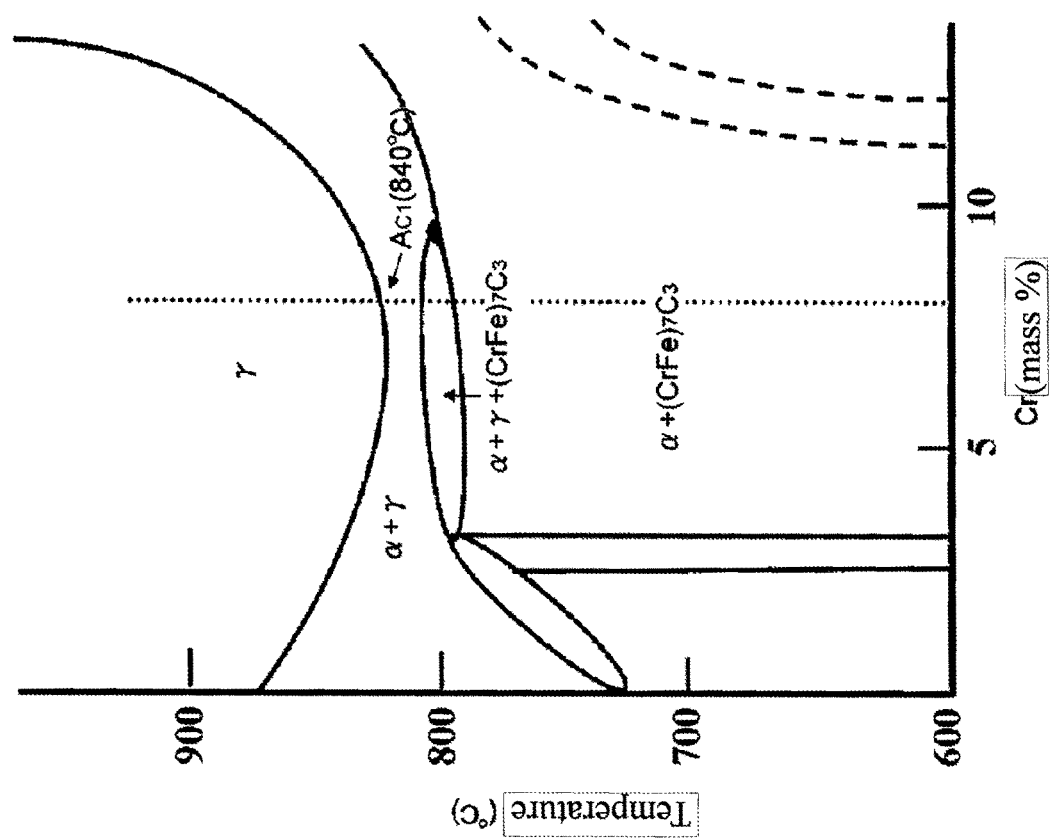
FIG. 4 is a phase diagram of a ferrous material 1.
Figure 5:
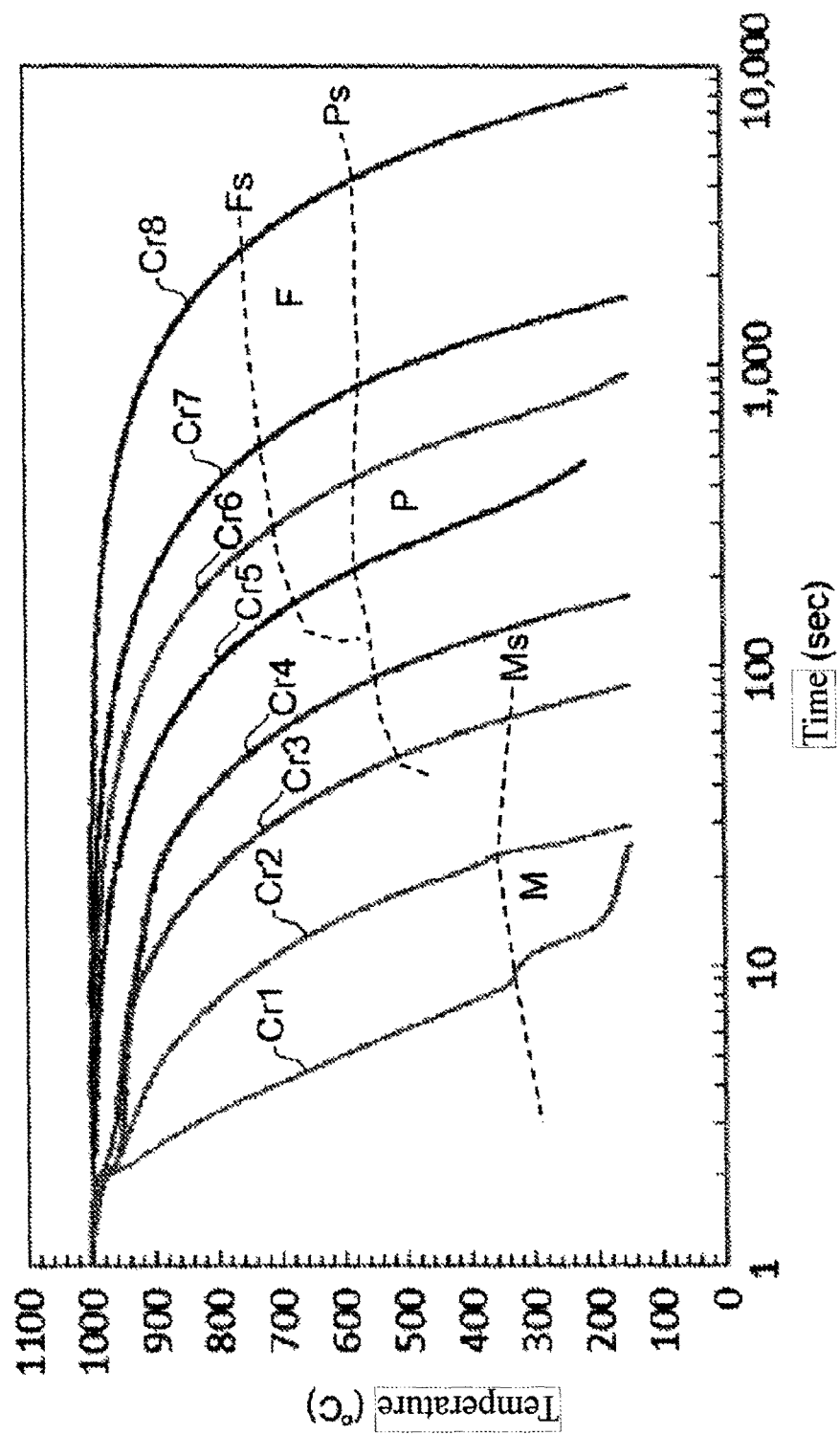
FIG. 5 is a CCT diagram of a ferrous material 2.

Hereafter, a method for manufacturing ferrous materials utilizing the friction stir welding technology is explained. As shown in FIG. 3, the stir zone 20 of the base material plates 1a and 1b is heated to an Ac1 point, which is a temperature where austenite appears, or higher, by rotating [the rotating tool 100] while the probe 102 at the tip of the rotating tool 100 comes into contact with on the stir zone 20 of the base material plates 1a and 1b (S101). As shown in a phase diagram of the ferrous material 1 in FIG. 4, if a ferrous material, such as the ferrous material 1, is heated to a temperature at the $A_{C1}$ point or higher, austenite appears in the region indicated with γ in the diagram. For example, in the ferrous material 1, the $A_{C1}$ point is 840° C. A ferrous material having high ductility while having high strength as mentioned later can be realized by causing austenite remain in the formation of the ferrous material. Furthermore, the $A_{C1}$ point of the ferrous material with various compositions can be obtained from the formula (1) below. Further, a heat input Q to the stir zone 20 upon friction stir processing can be obtained from the formula (2) below.

$$A_{C1}[°\ C.]=723-10.7\ Mn[mass\ \%]-16.9\ Ni[mass\ \%]+29.1\ Si[mass\ \%]+16.9\ Cr[mass\ \%]+290\ As[mass\ \%]+6.38\ W[mass\ \%] \quad (1)$$

$$Q=\tfrac{4}{3}\pi^2 \mu P N R^3 \cdot l/t \cdot l/v \quad (2)$$

μ: coefficient of friction, P: pressure of stirring part
N: rate of rotation of rotational tool,
R: diameter of shoulder, t: sheet thickness of stirring part,
v: traveling speed of rotational tool However, as shown in continuous cooling transformation diagram (CCT diagram) indicating phase transformation of the ferrous material in FIG. 5 on the occasion of continuously cooling on a plane of coordinates of time and temperature, if the ferrous material is cooled close to room temperature from a temperature exceeding the $A_{C1}$ point, transformation from austenite to martensite, or, from austenite to ferrite or pearlite will occur. As shown in FIG. 5, in the ferrous material that has been cooled to be less than an $M_s$ point, which is a temperature to cause martensite appearance, according to fast cooling rate cooling curves Cr1 to Cr3, as shown with a region M in the graph, transformation from austenite to martensite with inferior toughness will occur. Further, in the ferrous material that has been cooled to an $F_s$ point, which is a temperature to cause ferrite appearance, or to a $P_s$ point, which is a temperature to cause pearlite appearance, according to slow cooling rate cooling curves Cr4 to Cr8, as shown with regions F and P in the chart, transformation from austenite to ferrite or pearlite will occur. Consequently, no austenite remains in a formulation of a ferrous material that has been cooled down to room temperature after heating processing in general. Furthermore, the $M_s$ point per formation of the ferrous material can be obtained with the following formula (3):

$$M_s[°\ C.]=539-423\ C[mass\ \%]-30.4\ Mn\ [mass\ \%]-17.7\ Ni\ [mass\ \%]-12.1\ Cr\ [mass\ \%]-7.5\ Mo\ [mass\ \%] \quad (3)$$

Figure 6:
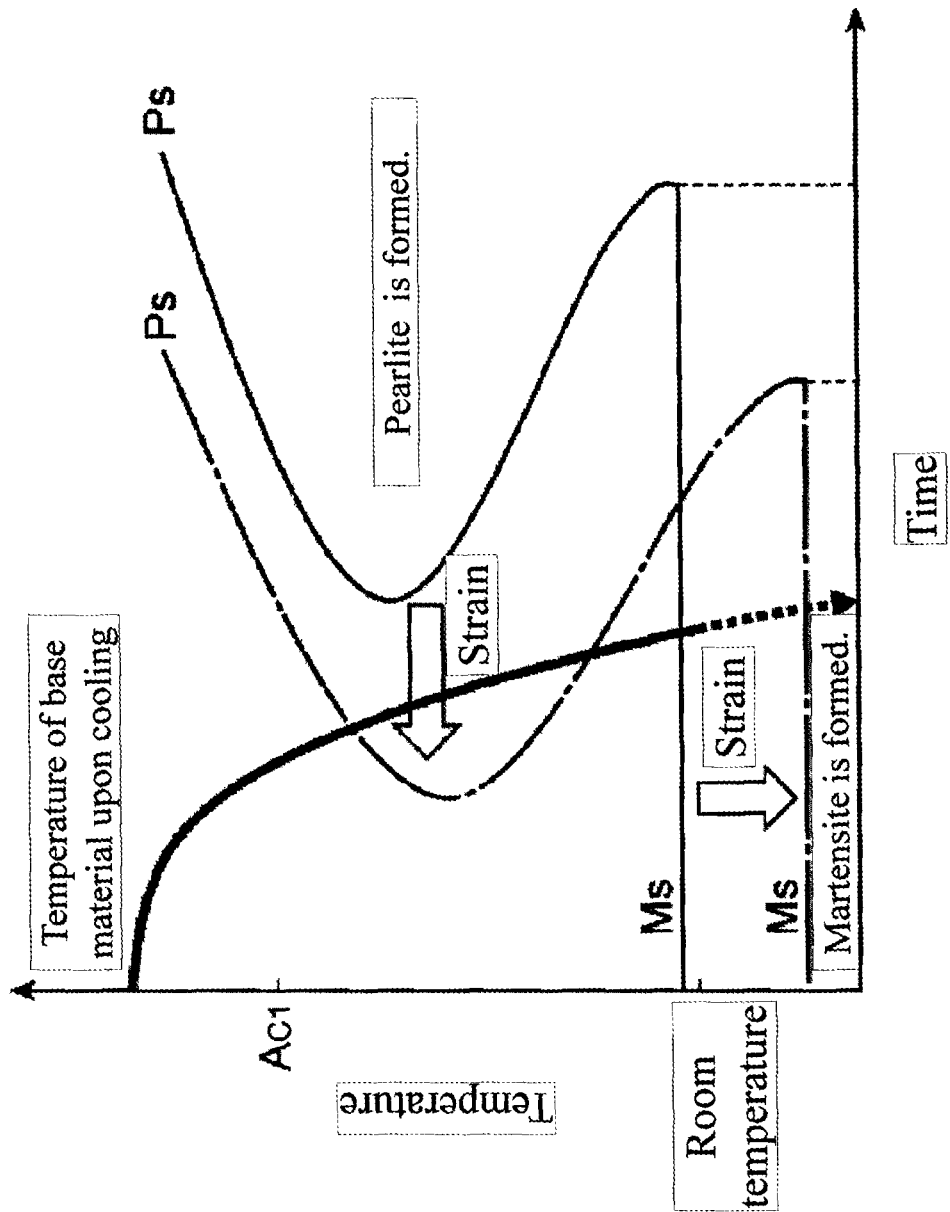
FIG. 6 shows an action to fluctuate a region where pearlite is produced and a region where martensite is produced in the CCT diagram, by introducing a strain into a ferrous material.

Then, in the present embodiment, as depicted in FIG. 3, austenite remains in the formation of the stir zone 20 of the base material plates 1a and 1b by introducing an amount of a strain, which is assumed that the $M_f$ point, which is a temperature to cause the base material plates 1a and 1b is to be martensite completely, is decreased to be less than a temperature for using a ferrous material, to the stir zone 20 of the base material plates 1a and 1b (S102). As shown in FIG. 6, if a strain is introduced into the stir zone 20 of the base material plates 1a and 1b, the $M_s$ point, which is a temperature to cause martensite appearance, is decreased. In association with the decrease in the $M_s$ point, the $M_f$ point (not-shown in FIG. 6), which is a lower temperature than the $M_s$ point, and which is a temperature to cause the base material plates 1a and 1b to be martensite completely, is also decreased. When the amount of a strain is sufficiently large, both the $M_f$ point and the $M_s$ point are decreased a temperature, which is lower than room temperature (20° C.). This enables to cause austenite to remain in the formation of the base material plates 1a and 1b even if the temperature where the ferrous material is used is room temperature. Furthermore, in the present embodiment, although it is possible to cause austenite to remain at a temperature for using the ferrous material by decreasing the $M_f$ point to be less than the temperature for using the ferrous material, in order to cause austenite to remain in the ferrous material completely, the $M_s$ point can be decreased to be less than the temperature for using the ferrous material.

In the present embodiment, introduction of a strain into the stir zone 20 of the base material plates 1a and 1b can be conducted in uniprocessing at the same time of heating to the $A_{C1}$ point or higher by rotating [the probe 102] while the probe 102 at the tip of the rotating tool 100 comes contact with on the stir zone 20 of the base material plates 1a and 1b. An amount of a strain to be introduced by utilizing such friction stir welding technology can be obtained with the formula (4) below. Furthermore, the formula (4) below, ϵ is a strain (strain rate that is an introduction amount of a strain per unit time where ϵ is differentiated by a time in the formula below); Rm is a value of ½ of the rotation rate of the rotating tool 100; $r_e$ is an effective (mean) radius of the stir zone 20; and $L_e$ is an effective (mean) depth of the stir zone 20. These values can be controlled by adjusting the rotation rate of the rotating tool 100, the diameter of the shoulder 101, the diameter of the probe 102 and the length of the probe 102.

$$\dot{\epsilon} = \frac{R_m \cdot 2\pi r_e}{L_e} \qquad (4)$$

Figure 7:
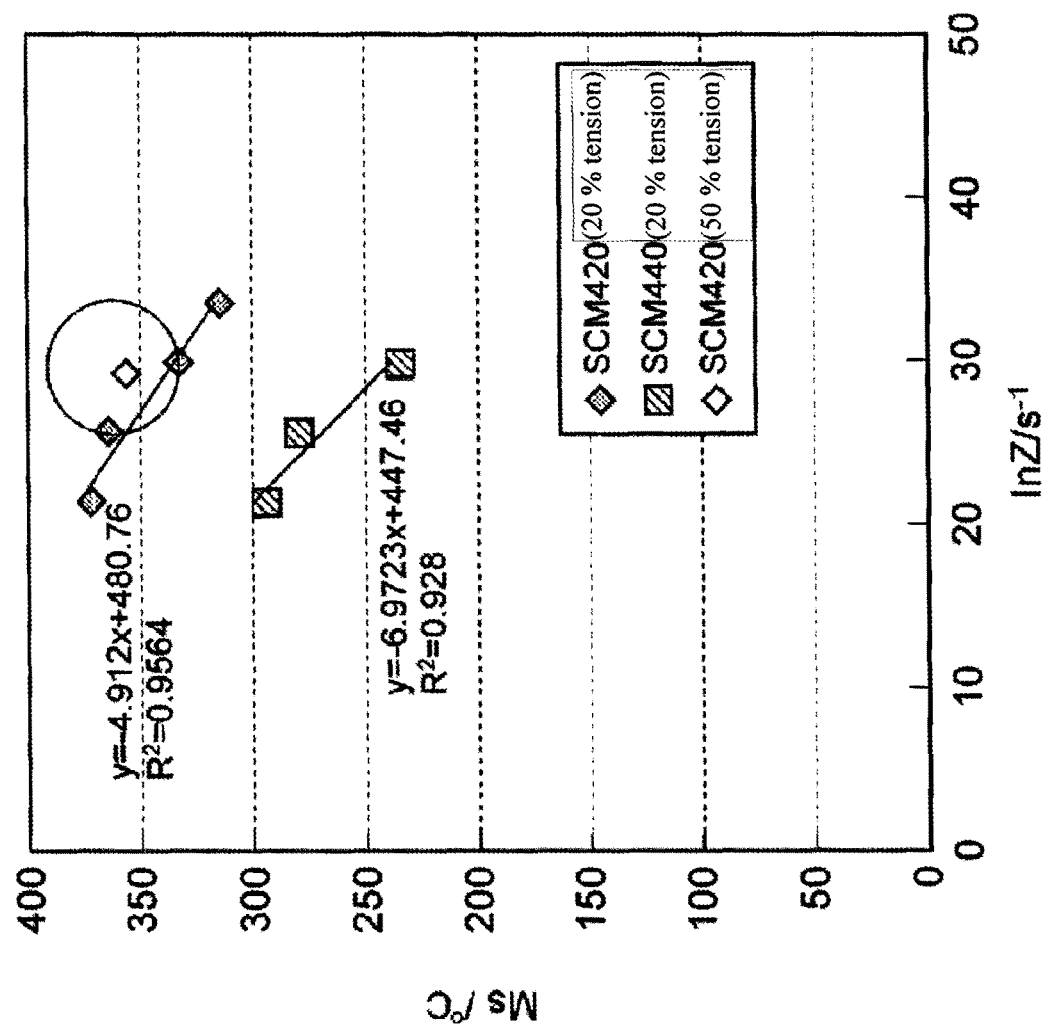
FIG. 7 is a graph showing a relationship between a Zener-Hollomon factor and an Ms point.

However, the higher the temperature of the base material plates 1a and 1b becomes, the more an effect to decrease the $M_f$ point due to the introduction of a strain is decreased. Then, a Zener-Hollomon factor Z that is compensated due to the temperature as shown in the formula (5) below is used for calculating the effect to decrease the $M_f$ point and the $M_s$ point due to the introduction of a strain. As shown in FIG. 7, it is ascertained that the $M_s$ point is decreased in association with a decrease of a natural logarithm of the Zener-Hollomon factor Z. Furthermore, in the formula (5) below, R is a gas constant in 1 mol, and $T_C$ is Curie temperature of iron.

$$Z = \dot{\epsilon} \exp\left(\frac{Q}{RT}\right) \qquad (5)$$

$Q$:241$kj \cdot mol^{-1} (T > T_C)$, 254$kj \cdot mol^{-1} (T < T_C)$

Returning to FIG. 3, the stir zone 20 of the base material plates 1a and 1b is cooled to the temperature for using a ferrous material (S103). Herein, as shown in FIG. 6, a strain is introduced into the stir zone 20 of the base material plates 1a and 1b, and if the $M_f$ point and the $M_s$ point are decreased, simultaneously, a region where pearlite is produced is also expanded. If cooling of the stir zone 20 of the base material plates 1a and 1b is finished within a region where the pearlite is produced in the stir zone 20 of the base material plates 1a and 1b on the CCT diagram as shown in FIG. 6, there is a possibility where the formation of the stir zone 20 of the base materials becomes pearlite and no austenite remains.

Then, in the present embodiment, as shown in FIG. 6, the stir zone 20 of the base material plates 1a and 1b is cooled at least to a temperature, which is higher than the $M_f$ point, and for example, to a temperature, which is higher than the $M_s$ point, at a cooling rate assuming that a line extrapolated with a cooling curve of the stir zone 20 of the base material plates 1a and 1b interests with the region where martensite is produced in the stir zone 20 of the base material plates 1a and 1b on the CCT line diagram (S103). This causes austenite to remain in the stir zone 20 of the base material plates 1a and 1b after cooling.

Furthermore, even if a line indicating a function of temperature of the stir zone 20 of the base material plates 1a and 1b to a time intersects with a region where pearlite is produced upon cooling the stir zone 20 of the base material plates 1a and 1b, when cooling is finished out than in the region where the pearlite is produced at last, austenite remains. However, in order to cause the austenite to remain in the ferrous material completely, the line indicating a function of a temperature of the stir zone 20 of the base material plates 1a and 1b to a time at the time of cooling the stir zone 20 of the base material plates 1a and 1b can be in the situation not to intersect with a region where pearlite is produced.

In the present embodiment, cooling of the stir zone 20 of the base material plates 1a and 1b can be conducted in uniprocessing at the same time of heating of the stir zone 20 and the introduction of a strain by traveling the tip of the rotating tool 100 along the stir zone 20 in a situation of rotating [the probe 102] while the probe 102 at the tip of the rotating tool 100 comes into contact with the stir zone 20 of the base material plates 1a and 1b. The cooling rate can be increased by increasing the rotation rate or the travel rate (welding rate) of the rotating tool 100, and the cooling rate can be decreased by decreasing the rate of rotation or the travel rate (welding rate) of the rotating tool 100.

Next, samples of the stir zone 20 of the base material plates 1a and 1b are collected, and formation of the samples are inspected (S104). The samples can be inspected by electron back-scatter diffraction (EBSD) or X-ray diffraction (XRD). When austenite remains in the inspected samples (S105), on the occasion of manufacturing a next ferrous material, an amount of a strain to be introduced in S102, and, diameter of the shoulder 101, diameter of the probe 102, length of the probe 102, the rotation rate and the travel rate of the rotating tool 100, which are conditions for the cooling rate in S103, are maintained (S106).

If no austenite remains in the inspected samples but martensite has been produced (S105), it is assumed that the $M_s$ point and the $M_f$ point have not sufficiently been decreased in S102. In this case, on the occasion of manufacturing a next ferrous material, in S102, at least either an amount of a strain or an amount of an austenite stabilization element, such as C, Mn, Ni, Cr or Mo, in the additive 10 into the base material plates 1a and 1b is increased (S107). The increase in the amount of a strain is realized by an increase in the strain ϵ in the formulae (4) and (5) above or due to the increase in the Zener-Hollomon factor Z. Specifically, the amount of a strain can be increased by an increase in the rotation rate of the rotating tool 100, an increase in the diameter of the shoulder 101 and an increase in the diameter of the probe 102. Further, the amount of a strain can be increased by decreasing a temperature of the stir zone 20 in the friction stir processing, as well.

Further, as shown in the formula (3) above, the more the amount of additive of C is increased, the more the $M_s$ point is decreased; therefore, it becomes possible to further decrease the $M_s$ point by the increase in the amount of C in the additive 10. This applies similarly in the $M_f$ point, as well. Furthermore, since the effect to decrease the $M_s$ point and the $M_f$ point is affected the most by the an additive amount of C, the degree to decrease the $M_s$ point and the $M_f$ point can be controlled by controlling the amount of C in the additive 10. However, the degree to decrease the $M_s$ point and the $M_f$ point can be increased by increasing an amount of any of Mn, Ni, Cr and Mo in the additive 10, as well.

If no austenite remains in the formation of the inspected samples but ferrite or pearlite has been produced (S105), since a cooling rate is too low in S103 or a region where ferrite or pearlite is produced has been excessively expanded, it is assumed that cooling is finished in the region where ferrite or pearlite is produced shown in FIG. 6. In this case, on the occasion of manufacturing a next ferrous material, in S103, at least either the cooling rate or an increase in an amount of an element to inhibit the diffusion transformation of an element, such as Mo, W, V or Ta, where its atomic radius is larger than Fe in the additive 10 to the base material plates 1a and 1b is increased (S108). The increase in the cooling rate is realized by increasing the rotation rate or the travel rate (welding rate) of the rotating tool 100. Alternatively, it is also realized by increasing an amount of cooling by a cooling means placed over or below the stir zone 20 of the base material plates 1a and 1b. This cooling means can increase the amount of externally-forcible cooling by increasing a usage of liquid $CO_2$.

Figure 8:
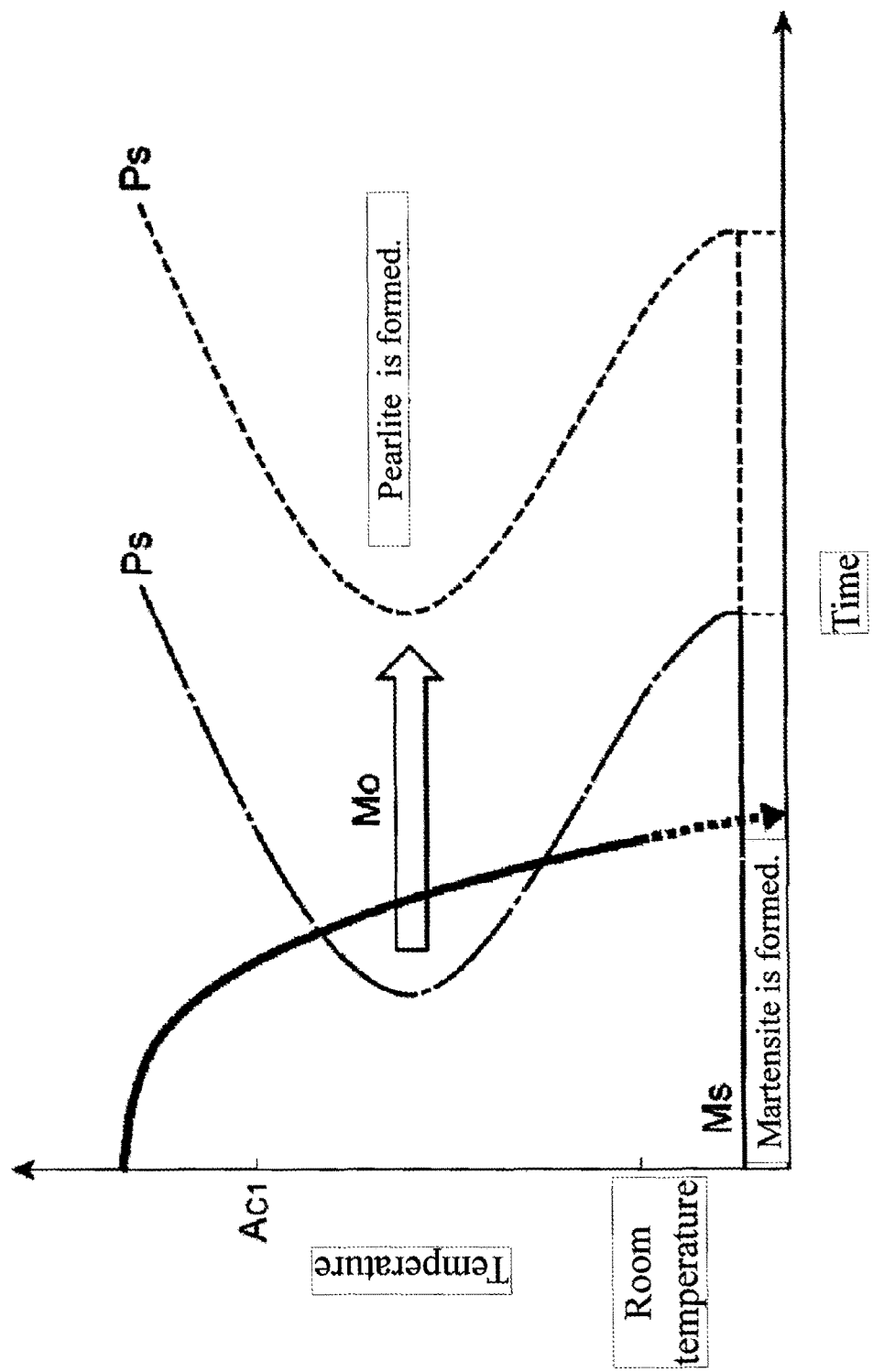
FIG. 8 shows an action to fluctuate a region where pearlite is produced by adding Mo.

Further, as shown in FIG. 8, the more the amount of the element to inhibit the diffusion transformation of the element, such Mo, W, V or Ta, where its atomic radius is larger than Fe in the additive 10 to the base material plates 1a and 1b becomes, the more the region where pearlite or ferrite is produced is decreased. As shown in FIG. 6, it is believed that when a strain is introduced into the stir zone 20, the region where pearlite or ferrite is produced in association with that strain, but if an atom that is larger than Fe, such as Mo, W, V or Ta, is added, the diffusion transformation is inhibited and the action to increase the region where pearlite or ferrite is produced will be suppressed. Consequently, cooling can be finished not within the region where ferrite or pearlite is produced but a region where austenite remains even at the same cooling rate, by increasing the amount of an element, where its atomic radius is larger than Fe, for inhibiting the diffusion transformation, such as Mo, W, V or Ta, in the additive 10.

A next ferrous material is manufactured under the controlled conditions above (S109). Furthermore, in S105, a ferrous material where more austenite remains can be manufactured upon manufacturing of the next ferrous material, by conducting a step in S107 when martensite has been produced even if austenite remains, and by conducting the step in S108 if ferrite or pearlite has been produced.

In the present embodiment, the base material plates 1a and 1b of the ferrous material are heated to the $A_{C1}$ point, which is a temperature to cause austenite appearance, or higher (S101). This enables to cause austenite appearance in the base material plates 1a and 1b. An amount of a strain assuming that the $M_f$ point, which is a temperature to cause t the base material plates 1a and 1b to become martensite completely, is decreased to be less than room temperature is introduced into the base materials (S102). Consequently, the all ferrous material becoming martensite on the occasion of cooling the ferrous material to room temperature can be prevented.

If a strain is introduced to the base material plates 1a and 1b, the region where ferrite or pearlite is produced is also expanded. However, the base material plates 1a and 1b are cooled to room temperature at a cooling rate assuming that a line extrapolated with a cooling curve, which is a function of a temperature of the base material plates 1a and 1b to a time, intersects with a region where martensite is produced in a continuous cooling transformation diagram (CCT line diagram) on a plane of coordinates of a time and a temperature where the phase transformation on the occasion of continuously cooling the base materials of the ferrous material is indicated (S103). Consequently, austenite remains in the manufactured ferrous material at room temperature.

When external stress is applied to a ferrous material where austenite remains, strained austenite is transformed to hard martensite, and strength in a strained portion is improved. As a result, the transformation in this portion is suppressed, and a TRIP effect where the transformation propagates an untransformed portion of austenite with relatively low strength occurs. Consequently, a ferrous material having high ductility while having high strength can be manufactured.

In the present embodiment, a ferrous material having high strength and high ductility is not realized because of an entire chemical formation of the ferrous material, but it is possible to realize a ferrous material having high strength and high ductility by entirely or locally adding any processing to the base materials of the ferrous material. For example, in a particular site of structural members of a vehicle, while shape of a vehicle body is maintained due to the high strength, it becomes necessary to absorb impact due to high ductility and to protect a vehicle occupant(s). However, according to the present embodiment, it is possible to bring high strength and high ductility only at a particular site by adding local processing to the particular site of the base materials of the ferrous material. When such ferrous material in the present embodiment is applied to the structural members of a vehicle, because the strength is gradually increased during deformation upon collision, an impact on a vehicle occupant(s) upon the collision can be reduced. Therefore, it can be expected that the structural member(s) of a vehicle where the processing in the present embodiment has been carried out shows superior collision safety. Consequently, industrial availability in the present embodiment is extremely high.

Further, in the present embodiment, the step to inspect the formation of the base materials 1a and 1b is further included (S104). When it is ascertained that no austenite remains in the base materials, but martensite has been produced (S105), it is assumed that the $M_f$ point is not sufficiently decreased relative to room temperature. Then, on the occasion of manufacturing a ferrous material next, at least either the amount of strain to be introduced into the base materials 1a and 1b in S102 or an additive amount of the austenite stabilization element, such as C, Mn, Ni, Cr or Mo, to the base materials 1a and 1b is increased (S107). This enables to cause austenite to remain by sufficiently decreasing the $M_f$ point relative to room temperature.

Further, if it is ascertained that no austenite remains in the base materials 1a and 1b but either ferrite or pearlite has been produced (S105), in order to avoid the region where ferrite or pearlite is produced on the CCT line diagram, it is assumed that the cooling rate is too low or the region where ferrite or pearlite is produced has been excessively produced. Then, on the occasion of manufacturing a ferrous material next, at least either the cooling rate in S103 or the additive amount of an element to inhibit diffusion transformation of an element where its atomic radius is larger than Fe, such as Mo, W, V or Ta, to the base material plates 1a and 1b is increased (S108). This enables to avoid the region where ferrite or pearlite on the CCT line diagram is produced, and to cause austenite to remain.

Further, in the present embodiment, the base material plates 1a and 1b are heated and a strain is introduced into the base material plates 1a and 1b by rotating the rotating tool 100 while a tip portion of the rod-shaped rotating tool 100 comes into contact with the base material plates 1a and 1b, and the base material plates 1a and 1b is cooled by traveling the tip part of the rotating tool 100 in the situation where the rotating tool 100 is rotated while the tip part of the rotating tool 100 comes contact with the base material plates 1a and 1b. Due to utilization of such friction stir welding technology, it becomes possible to conduct the heating, the introduction of a strain and the cooling in uniprocessing. Further, due to the utilization of the friction stir welding technology, it becomes easy to locally heat the base material plates 1a and 1b, and to locally introduce a strain into the base material plates 1a and 1b. Further, in the present embodiment, it becomes easy to control the cooling rate by adjusting the travel rate of the tip part of the rotating tool 100 and the rotation rate of the rotating tool 100.

Furthermore, the present invention is not limited to the embodiment above, and various modified forms are possible. For example, in the embodiment above, the mode to join the base material plates 1a and 1b with each other by traveling the tip part of the rotating tool 100 while the tip part of the rotating tool 100 comes into contact with the base material plates 1a and 1b, and to produce a ferrous material in the stir zone due to the joining of them was mainly explained. However, in another embodiment of the present invention, a ferrous material may be produced in the stir zone 20 due to a spot type friction stir welding technology (friction stir spot welding) to stop the tip part of the rotating tool 100 at a single site or a plurality of sites in the situation the rotating tool 100 is rotated while the tip part of the rotating tool 100 comes into contact with the base material plates 1a and 1b. In this case, the base material plates 1a and 1b can be cooled by separating the tip part of the rotating tool 100 from the base material plates 1a and 1b. The cooling rate can be controlled by adjusting a drawing rate and a rotation rate of the rotating tool 100.

Figure 9:
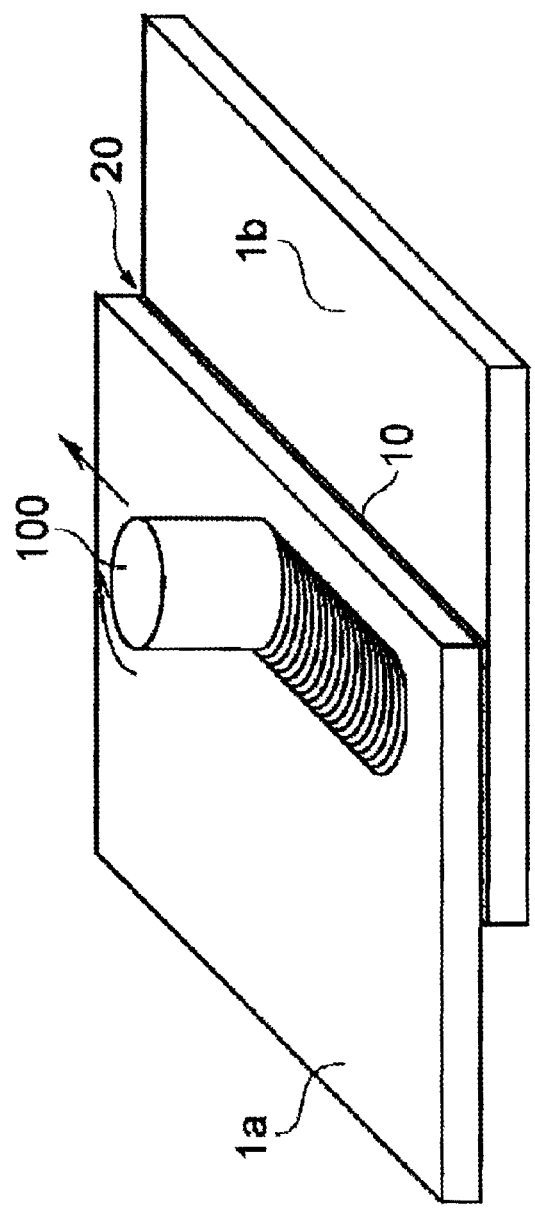
FIG. 9 is a perspective view showing another mode of friction stir welding in the method for manufacturing a ferrous material in the embodiment.
Figure 11:
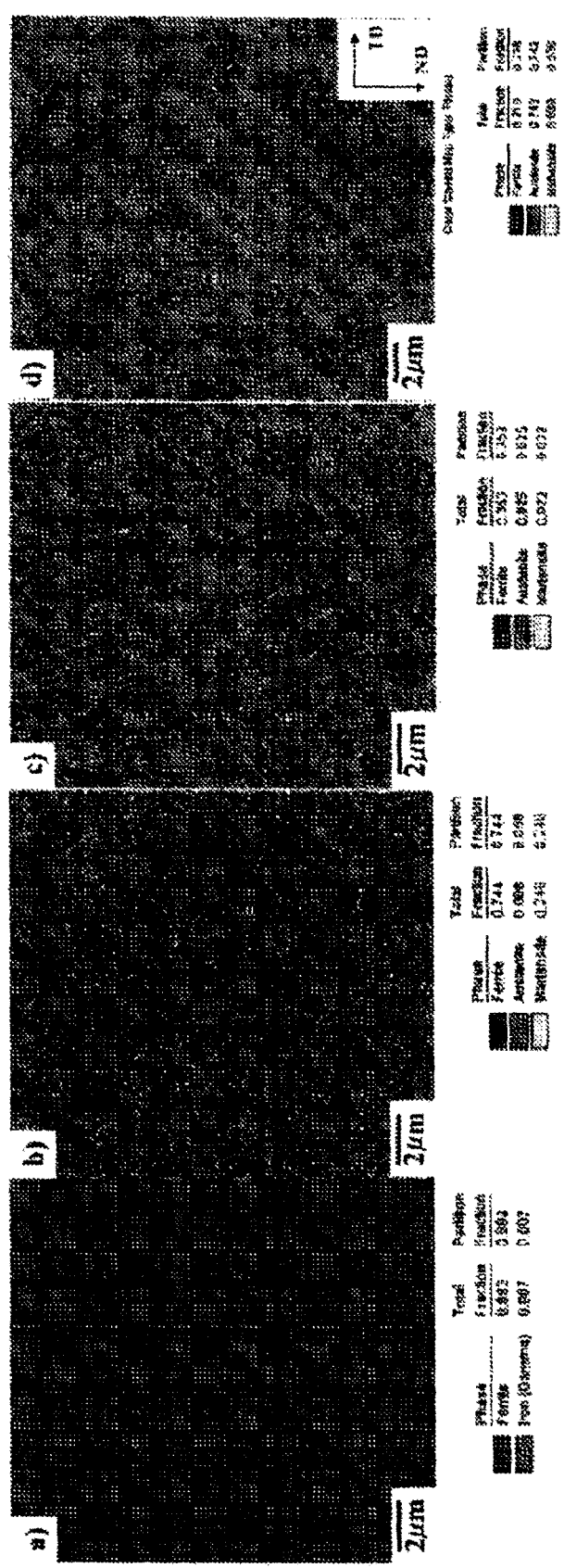
FIGS. 11(a) to (d) show phase maps of a stirring part of the ferrous material 1 in Experimental example 1, and show phrase maps of the stirring part at 100 rpm, 200 rpm, 300 rpm and 400 rpm of a rate of rotation, respectively.

Alternatively, as shown in FIG. 9, friction stir processing may be conducted in a mode that is similar to superimposition joining to allow stirring of the stir zone 20 by superimposing the base material plates 1a to 1b and filling the powdery or granular additive 10 in between, or by arranging the plate-state or sheet-state additive 10 to be the stir zone 20, and rotating the rotating tool 100 while coming into contact with the base material plate 1a and traveling on the base material plate 1a. Even in this case, the spot-type friction stir processing not in association with the movement of the rotating tool 100 can be realized.

Alternatively, after the powdery, granular, plate-state or sheet-state additive 10 is supplied to the surface of the single base material plate 1a without association with joining of the base materials with each other, the formation of the stir zone 20 is reformed and a ferrous material may be produced in the stir zone 20 by causing to stir the stir zone 20 due to rotation of the rotating tool 100 while coming into contact with the base material plate 1a and movement on the base material plate 1a. Even in this case, the spot type friction stir processing without association with the movement of the rotating tool 100 can be realized. Furthermore, in the various friction stir welding and friction stir processing above, the arrangement of the additive 10 can be omitted if not necessary.

In addition, in the embodiment above, the mode to manufacture a ferrous material having high strength and high ductility by utilizing the friction stir processing was explained. However, the embodiments of the present invention are not limited to this, and it is possible to manufacture a ferrous material with high strength and high ductility other than the friction stir processing, by conducting heating of the base materials of the ferrous material, the introduction of a strain and the cooling so as to match the conditions defined in the embodiments of the present invention. For example, the base materials of the ferrous material can be heated with a predetermined thermal source. Further, a strain can be introduced into the base materials of the ferrous material by processing, such as rolling or forging. Further, the base materials of the ferrous material can be cooled with a predetermined cooling means.

Experimental Example 1

Hereafter, experimental examples of the present embodiment are described. For the ferrous material 10 having the chemical composition shown in FIG. 10, a ferrous material was produced in a joint portion by utilizing the friction stir welding. As the rotating tool, a cemented carbide tool of WC was used. A simple-shaped tool characterized by a columnar probe having no screws and a shoulder having 10° of concave inclination was used. End portions of a flat plate of the ferrous material 1 with 200 mm of length×50 mm of width×1.5 mm of thickness were butted with each other and joined by friction stir welding. The joining conditions were shoulder diameter=12 mm, probe diameter=4 mm, probe length=1.3 mm and inclination of rotating tool=3°. The rotation rate was set at 100 rpm to 400 rpm, and the welding rate was maintained at 100 mm/min. Because the ferrous material is drastically softened if being at 750° C. or higher, a load was reduced as much as possible and [the tip parts] were joined. As shield gas for the purpose of oxidation prevention of the rotating tool and the stirring part, argon gas was used at a 30 l/min of flow rate upon joining. For the purpose of cooling the rotating tool and a joining device, a water-cooling cooling holder was mounted.

The stir zone was inspected. As shown in phase maps in FIGS. 11(a) to (d), microstructure of the base material of the ferrous material 1 was ferrite and tempered martensite, but an increase of the residual amount of austenite that is indicated with gray among black, gray and white in the maps in association with the increase of the rotation rate can be confirmed.

Figure 12:
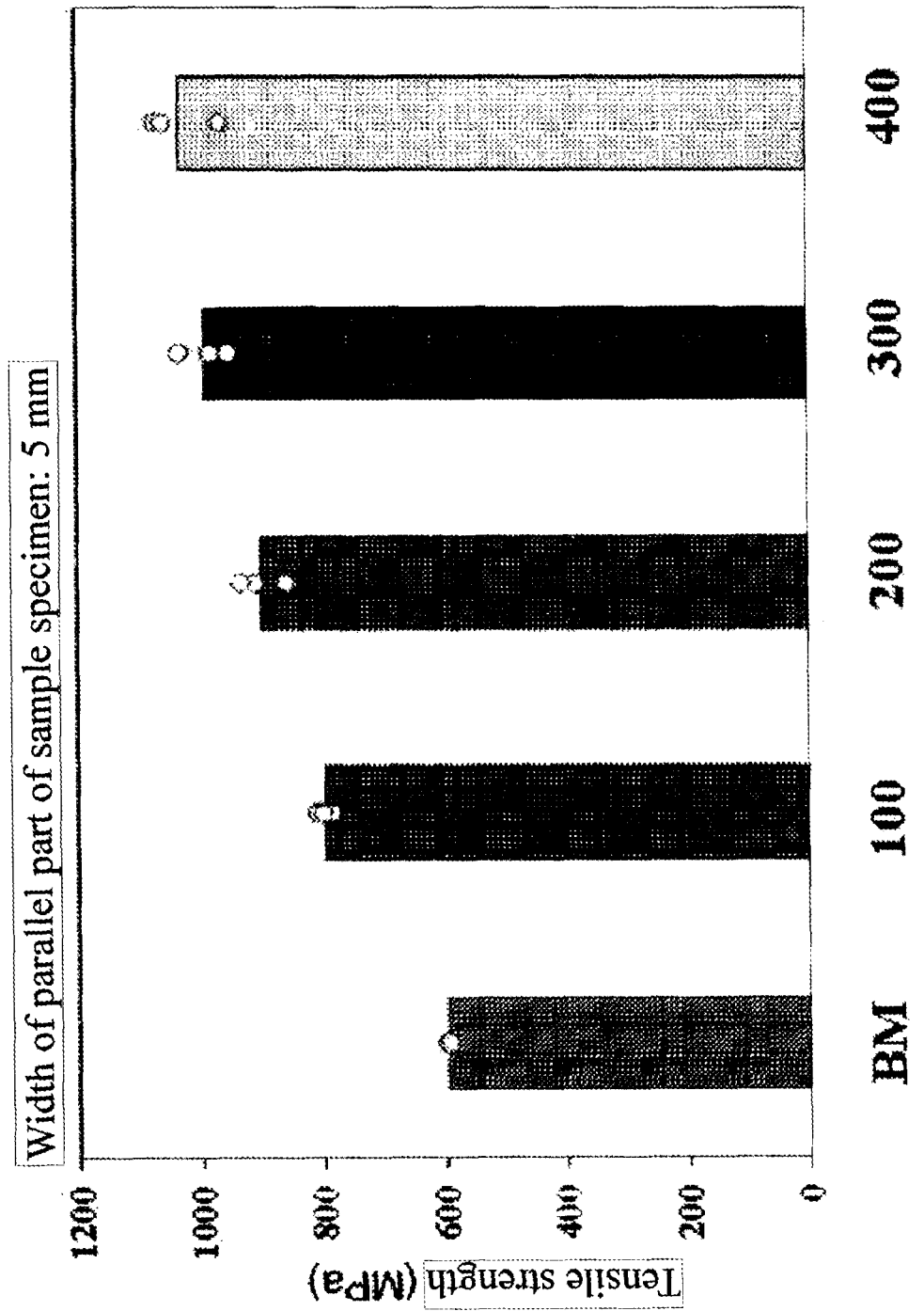
FIG. 12 is a graph showing tensile strength of the base material and samples obtained at various rotation rates in Experimental example 1. A width of the parallel part of the specimen for the tensile test is 5 mm.
Figure 13:
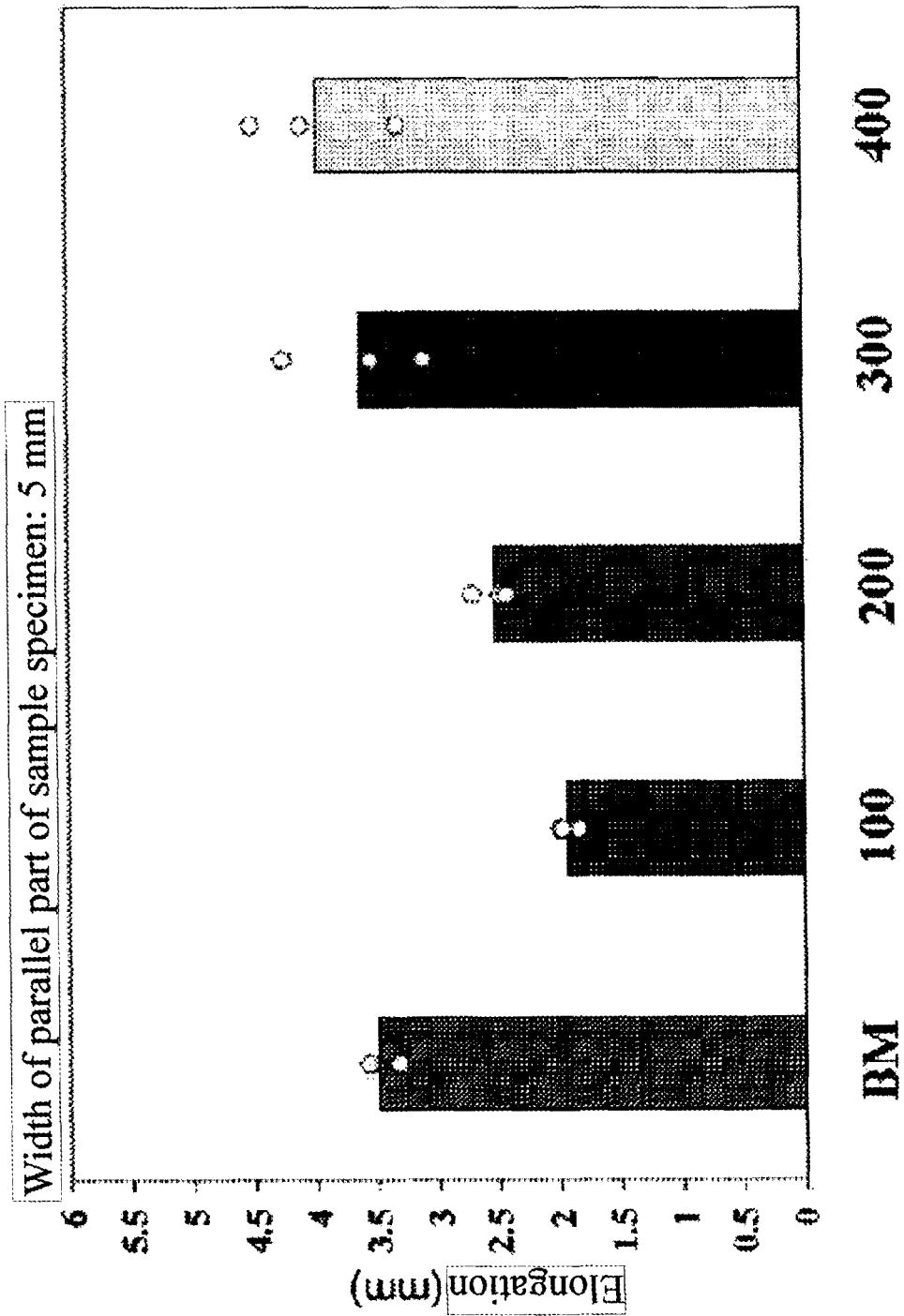
FIG. 13 is a graph showing elongation of the base material and samples obtained at various rotation rates in Experimental example 1. A width of the parallel part of the specimen for the tensile test is 5 mm.
Figure 14:
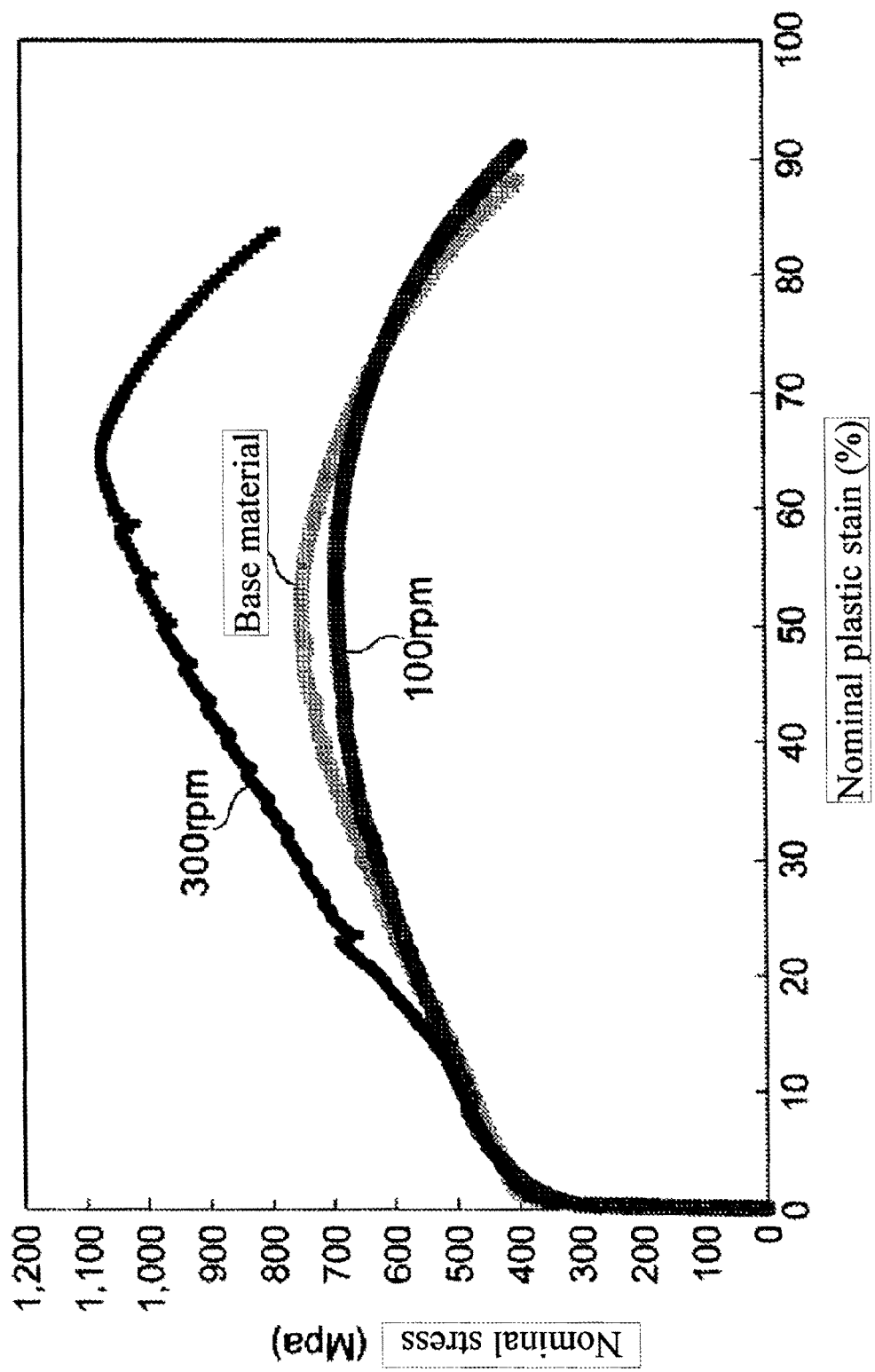
FIG. 14 is a graph showing a nominal stress-nominal plastic strain curve of the base material and a sample at 100 rpm of rotation rate and a sample at 300 rpm of rotation rate in Experimental example 1.

For the base material and the joints obtained at various rotation rates, width of a parallel portion in test specimens was set at 5 mm and a tensile test was conducted. As shown in FIG. 12, it is ascertained that tensile strength is increased in the joints with 300 rpm and 400 rpm of rotation rate with a lot of residual austenite compared to a base material (BM) and the joints obtained at other rotation rates. Further, as shown in FIG. 13, it is ascertained that elongation is increased in the joints with 300 rpm and 400 rpm of rotation rate with a lot of residual austenite compared to the base material (BM) and the joints at other rotation rate even though the tensile strength is improved. In other words, as shown in FIG. 14, it is ascertained that the joint at 300 rpm of rotation rate with a lot of residual austenite is one where both the strength and ductility have been improved compared to the base materials and the joint at 100 rpm of rotation rate.

Experimental Example 2

For the ferrous material 2 and the ferrous material 3 having the chemical composition shown in FIG. 15, ferrous materials were produced in the joint portion by utilizing the friction stir welding. The joining conditions were shoulder diameter=12 mm, probe diameter=4 mm and probe length=1.3 mm. As the joining conditions, rotation rate of rotating tool=200 rpm to 400 rpm, welding rate=100 mm/min and 400 mm/min, an applied load from the rotating tool to the base material=1,500 kg to 3,300 kg, plate thickness of the ferrous material 2 and the ferrous material 3=1.6 mm. For the ferrous material 2, the rotation rate was maintained at 400 rpm, and the welding speed was changed to 100 mm/min and 400 mm/min. For the ferrous material 3, the rotation rate was maintained at 400 rpm, and the welding speed was changed to 200 mm/min, 300 mm/min and 400 mm/min.

Figure 16:
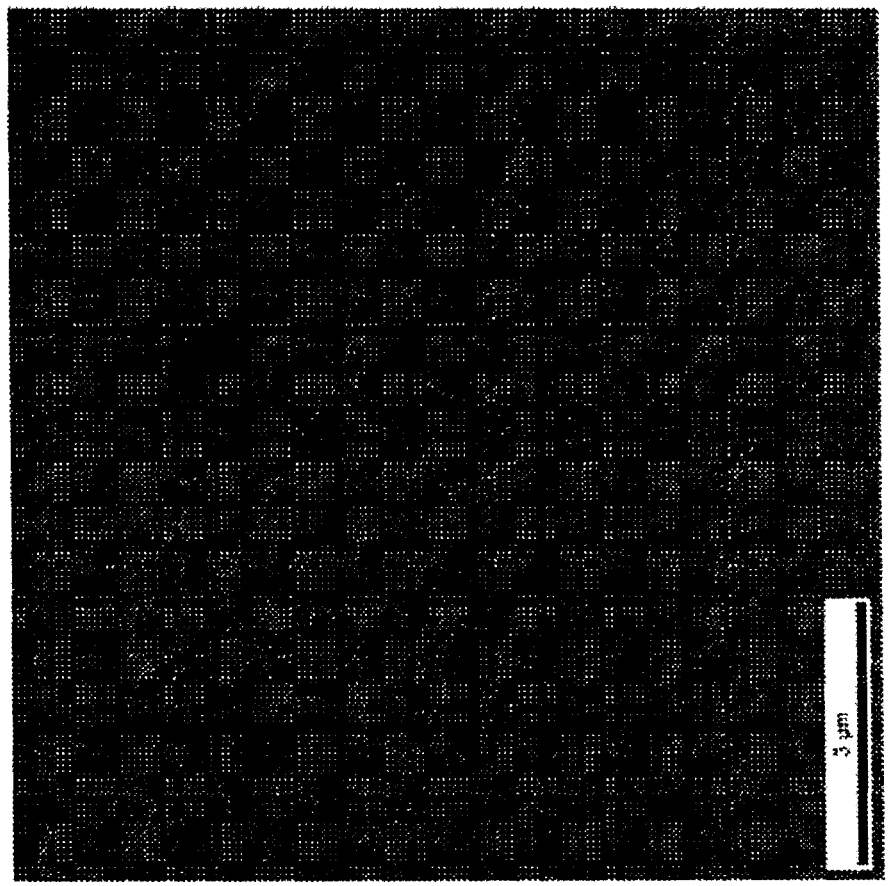
FIG. 16 shows an EBSD phase distribution image of a base material of the ferrous material 2 in Experimental example 2.
Figure 17:
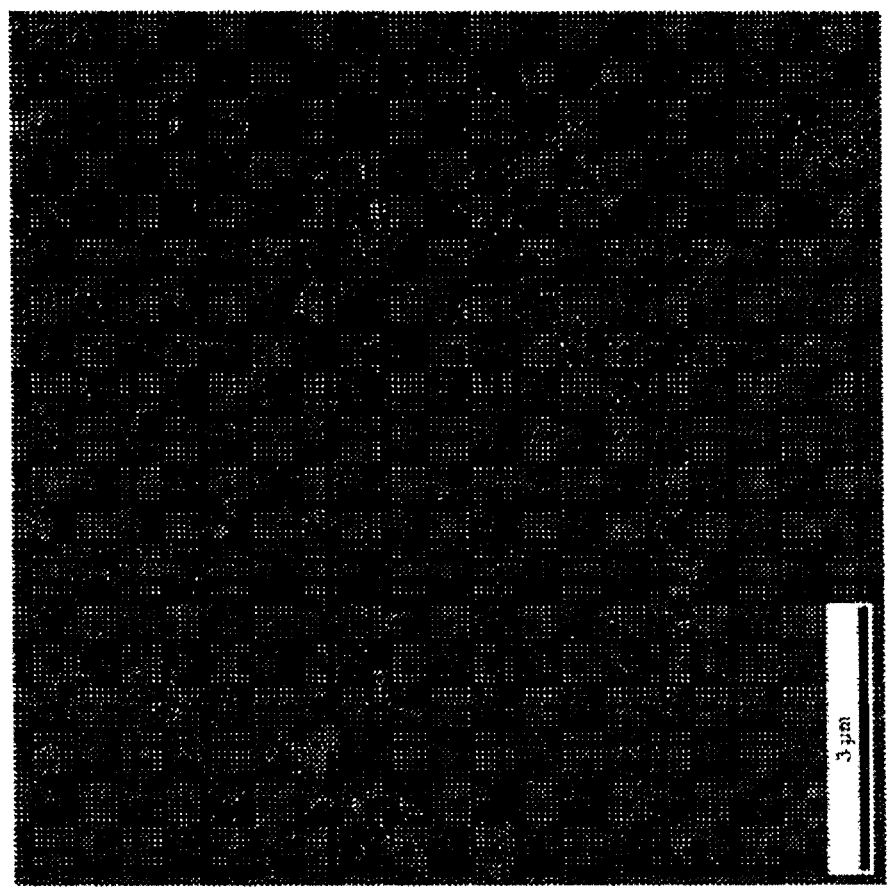
FIG. 17 shows an EBSD phase distribution image of the stir zone of the ferrous material 2 at 400 rpm of rotation rate—100 mm/min of traveling rate in Experimental example 2.
Figure 18:
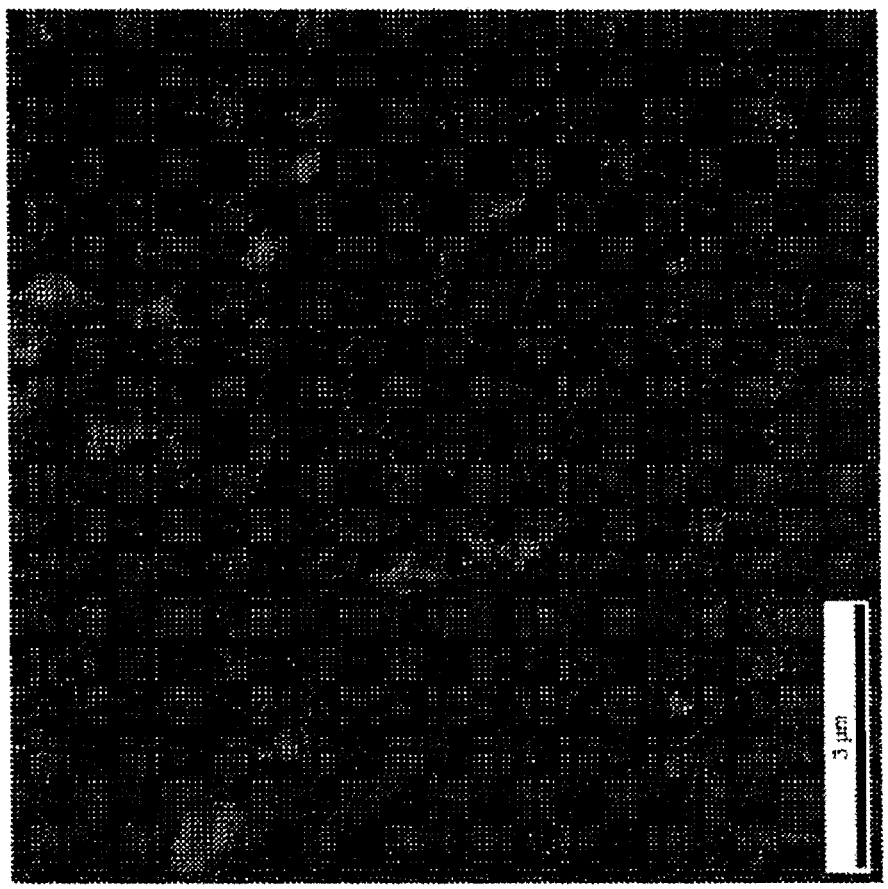
FIG. 18 shows an EBSD phase distribution image of the stir zone of the ferrous material 2 at 400 rpm of rotation rate—400 mm/min of travel rate in Experimental example 2.
Figure 19:
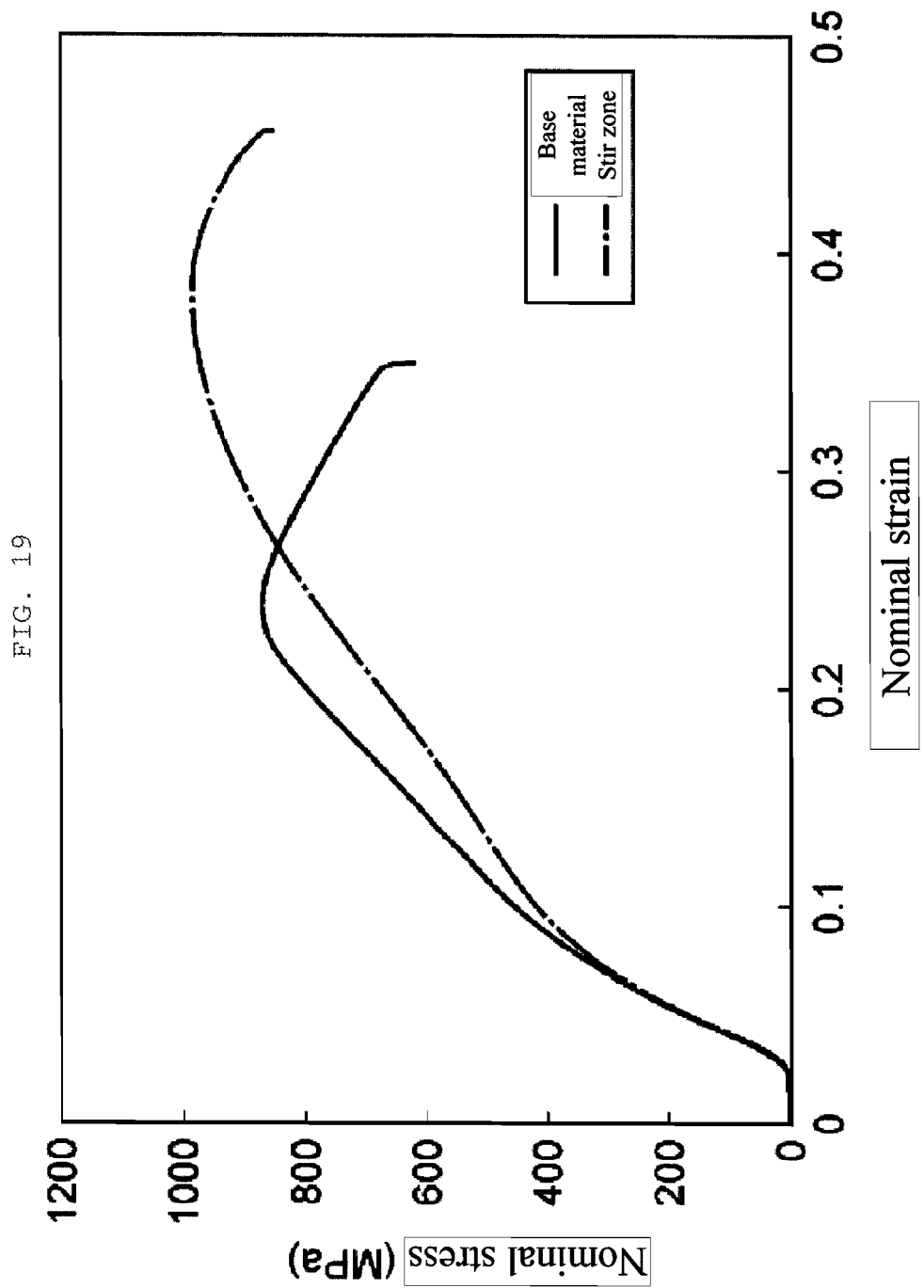
FIG. 19 is a graph showing nominal stress-nominal plastic strain curve of the base material of the ferrous material 2 at 400 rpm of rotation rate—400 mm/min of travel rate in Experimental example 2.
Figure 20:
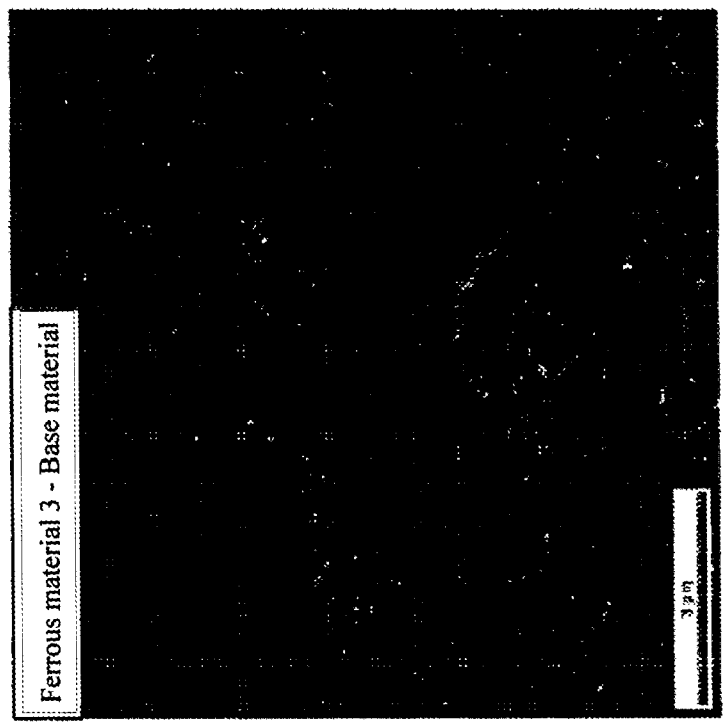
FIG. 20 shows an fcc orientation map of a base material of the ferrous material 3 in Experimental example 2.
Figure 21:
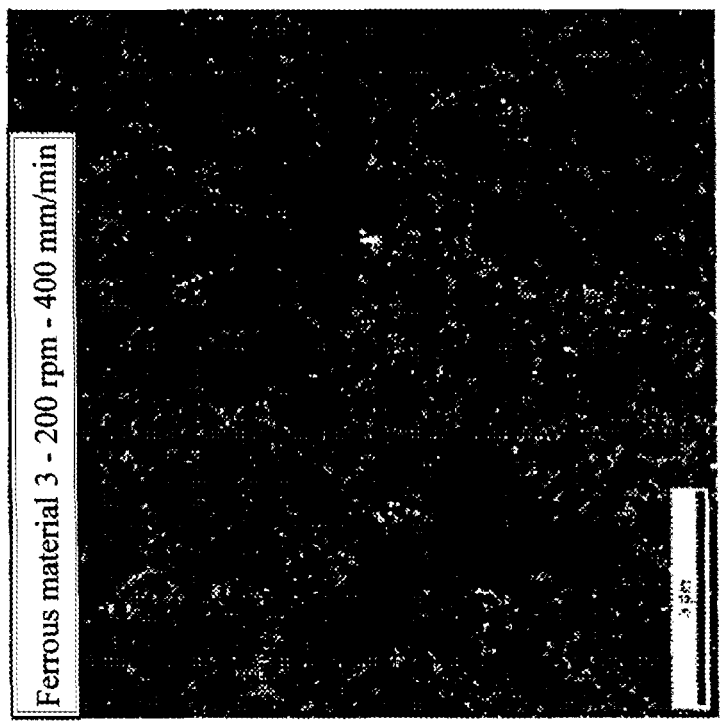
FIG. 21 shows an fcc orientation map of a base material of the ferrous material 3 at 200 rpm of rotation rate—400 mm/min of travel rate in Experimental example 2.
Figure 22:
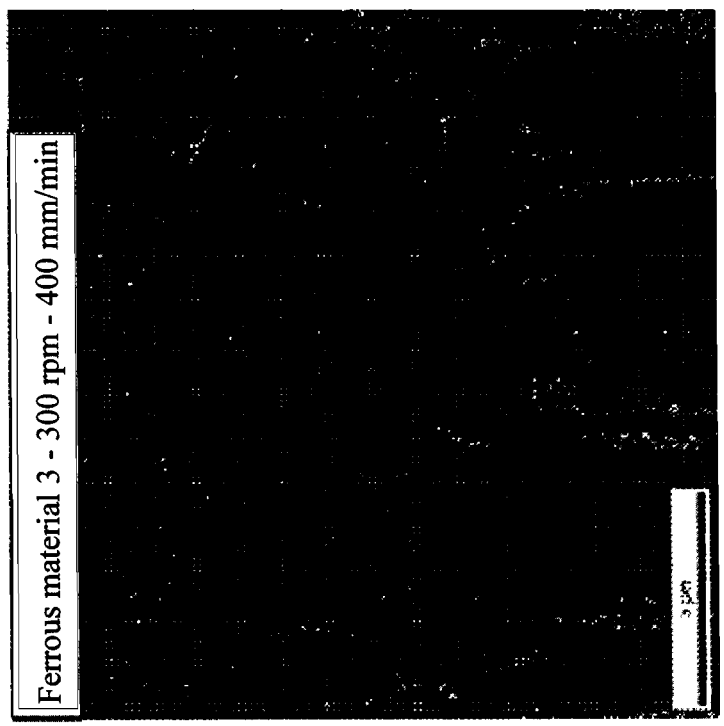
FIG. 22 shows an fcc orientation map of a base material of the ferrous material 3 at 300 rpm of rotation rate—400 mm/min of a travel rate in Experimental example 2.
Figure 23:
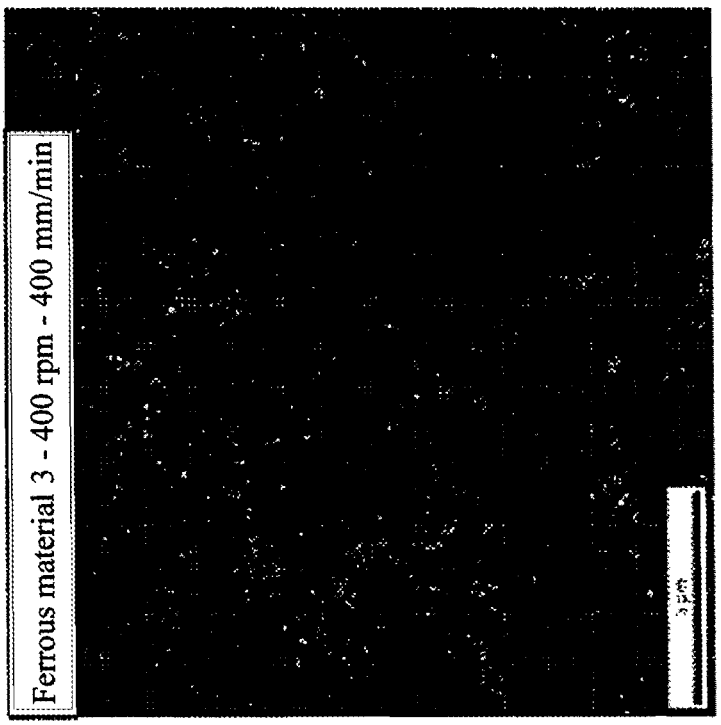
FIG. 23 shows an fcc orientation map of a base material of the ferrous material 3 at 400 rpm of rotation rate—400 mm/min of travel rate in Experimental example 2.

The stir zone was inspected by EBSD. It is ascertained that residual austenite indicated with gray in the drawing is less in base materials of the ferrous material 2 shown in FIG. 16 and in a joining portion formed under conditions of 400 rpm of rotation rate and 100 mm/min of welding speed for the ferrous material 2 shown in FIG. 17. In the meantime, it is ascertained that residual austenite indicated with gray in the drawing is a lot in a joining portion formed under conditions of 400 rpm of rotation rate and 400 mm/min of welding speed for the ferrous material 2 shown in FIG. 18. For the base materials and the joints obtained at various welding speeds, a tensile test was conducted. As shown in FIG. 19, it is ascertained that both strength and ductility have been improved in the joint at 400 mm/min of welding speed with a lot of residual austenite.

it is ascertained that residual austenite indicated with a brighter color in the drawing is a lot in a joint of the ferrous material 3 formed under conditions of 400 rpm of rotation rate and 100 mm/min of welding speed compared to the base material and the joints formed at other rotation rates of the ferrous material 3 shown in FIGS. 22 and 23.

Experimental Example 3

Figure 25:
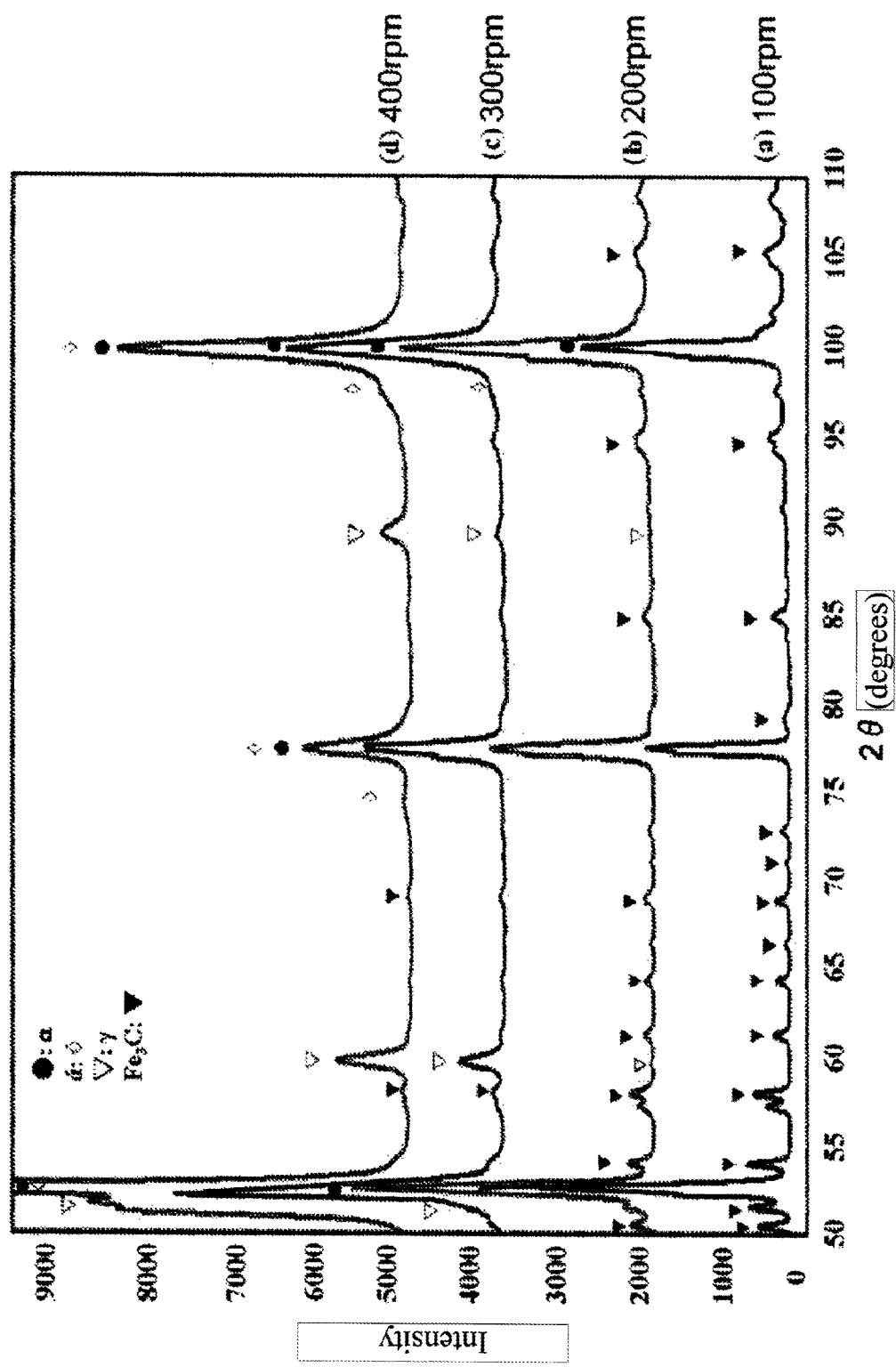
FIG. 25 is a graph showing XRD patterns of the stir zone at different rotation rates in Experimental example 3.

For a ferrous material 4 having chemical composition shown in FIG. 24, a ferrous material was produced in a joint portion by utilizing the friction stir welding. Plate thickness=2 mm, a rotation rate of the rotating tool=100 rpm to 400 rpm, and travel rate of the rotating tool was maintained at 100 mm/min. The rotating tool was made of cemented carbide, and shoulder diameter=12 mm, probe diameter=4 mm and probe length=1.8 mm. The stir zone of the obtained joint portion was inspected with XRD. As shown in FIG. 25, it is ascertained that a peak of residual austenite ($\gamma$) becomes higher if the rotation rate is increased.

INDUSTRIAL AVAILABILITY

According to the manufacturing method in one embodiment of the present invention, it becomes possible to manufacture a ferrous material having high ductility while having high strength.

DESCRIPTION OF SYMBOLS 1a, 1b base material plate
10 additive
20 stir zone
100 rotating tool
101 shoulder
102 probe

What is claimed is:

1. A method for manufacturing a ferrous material, comprising the steps of:
   heating the base material of a ferrous material to an $A_{C1}$ point or higher;
   introducing an amount of a strain assuming that an $M_f$ point is decreased to be less than a temperature for using the ferrous material; and
   cooling the base material, on which the heating step and the strain introduction step have been carried out, to a temperature that is higher than the $M_f$ point at a cooling rate, so that a line extrapolated with a cooling curve intersects with a region where martensite is produced in the base material on a continuous cooling transformation diagram; and
   inspecting the microstructure of the base material where the cooling step has been carried out so that no austenite remains in the base material, to identify at least one of martensite, ferrite and pearlite, wherein
   when martensite has been produced, at least an amount of a strain is introduced into the base material in the strain introduction step or an additive amount of an austenite stabilization element to the base material is increased; and
   when either ferrite or pearlite has been produced, either a cooling rate in the cooling step or an additive amount of an element that suppresses diffusion transformation to the base material, is increased.

2. The method for manufacturing a ferrous material according to claim 1, wherein
   in the heating step and the strain introduction step, the strain is introduced into the base material by rotating a rod-shaped rotating tool, wherein a tip part of the rod-shaped rotating tool comes into contact with the base material; and
   in the cooling step, the base material is cooled at least either by moving the tip part of the rod-shaped rotating tool as the rod-shaped rotating tool is rotated, wherein the tip part of the rod-shaped rotating tool comes into contact with the base material, or by separating the tip part of the rod-shaped rotating tool from the base material.

3. The method for manufacturing a ferrous material according to claim 1, wherein
   in the heating step and the strain introduction step, the strain is introduced into the base material by rotating a rod-shaped rotating tool, wherein a tip part of the rod-shaped rotating tool comes into contact with the base material; and
   in the cooling step, the base material is cooled at least either by moving the tip part of the rod-shaped rotating tool as the rod-shaped rotating tool is rotated while the tip part of the rod-shaped rotating tool comes into contact with the base material or by separating the tip part of the rod-shaped rotating tool from the base material.

* * * * *